(12) United States Patent
Redmann (10) Patent No.: US 8,749,199 B2
(45) Date of Patent: Jun. 10, 2014

(54) METHOD AND APPARATUS FOR CHARGING AN ELECTRIC VEHICLE FROM A STREETLIGHT

(76) Inventor: William Gibbens Redmann, Glendale, CA (US)

( * ) Notice: Subject to any disclaimer, the term of this patent is extended or adjusted under 35 U.S.C. 154(b) by 346 days.

(21) Appl. No.: 13/352,354

(22) Filed: Jan. 18, 2012

(65) Prior Publication Data

US 2013/0015707 A1 Jan. 17, 2013

Related U.S. Application Data

(63) Continuation-in-part of application No. 12/387,877, filed on May 8, 2009, now Pat. No. 8,111,043.

(51) Int. Cl.
*B60L 1/00* (2006.01)
*B60L 5/00* (2006.01)
*H02J 1/00* (2006.01)

(52) U.S. Cl.
CPC ... *B60L 1/00* (2013.01); *B60L 5/00* (2013.01); *B60L 2230/00* (2013.01); *H02J 1/00* (2013.01)
USPC ............ 320/109; 320/107; 320/111; 320/123

(58) Field of Classification Search
USPC .................................. 320/109, 107, 111, 123
See application file for complete search history.

(56) References Cited

U.S. PATENT DOCUMENTS

| | | | |
|---|---|---|---|
| 2008/0053716 A1* | 3/2008 | Scheucher | 180/2.1 |
| 2009/0138149 A1* | 5/2009 | Chattot | 701/22 |
| 2010/0145885 A1* | 6/2010 | Graziano et al. | 705/412 |

* cited by examiner

*Primary Examiner* — Huy Q Phan
*Assistant Examiner* — Temilade S Rhodes-Vivour (57) ABSTRACT

Streetlights along streets and in parking lots are often suitably located for a vehicle to park in immediate proximity. An electric vehicle charging system and method allows the power supply previously dedicated to the streetlight to be used for electric vehicle recharging whenever the streetlight is not required to be lit. In some embodiments, if the total of the current drawn by the electric vehicle charging and the lit streetlight is less than the rating of the streetlight power supply, then charging may continue even while the streetlight is lit. Further, if an electric vehicle so charging offers a utility-interactive inverter, then upon demand the electric vehicle may be available to supply power back to the electric grid.

18 Claims, 8 Drawing Sheets

METHOD AND APPARATUS FOR CHARGING AN ELECTRIC VEHICLE FROM A STREETLIGHT

CROSS REFERENCE TO RELATED APPLICATIONS

The present application is a continuation-in-part of U.S. patent application Ser. No. 12/387,877, filed May 8, 2009 now U.S. Pat. No. 8,111,043, incorporated herein by reference in its entirety.

FIELD OF THE INVENTION

The present invention relates generally to a system and method for charging electric vehicles by using the electric service provided for streetlights. More specifically, the present invention relates to a system and method for allowing the charging of electric vehicles when the operation of a streetlight whose power source has been tapped is called for.

STATEMENT REGARDING FEDERALLY SPONSORED RESEARCH OR DEVELOPMENT

Not Applicable

REFERENCE TO COMPUTER PROGRAM LISTING APPENDICES

Not Applicable

BACKGROUND OF THE INVENTION

A drawback that inhibits wide adoption of electric vehicles is the lack of infrastructure for conveniently charging them; and while hybrid electric vehicles are increasingly popular, plug-in versions that operate to maximize use of their battery and minimize use of their gasoline-fueled generator are rare, in part due to the same lack of infrastructure.

Provision of a vehicle charging infrastructure is inhibited primarily by cost: Such infrastructure has been expensive, typically requiring allocation of a physical location that vehicles can access and providing new electric service to that location.

OBJECTS AND SUMMARY OF THE INVENTION

The present invention relates generally to a system and method for charging electric vehicles by using the electric service provided to streetlights. More specifically, the present invention relates to a system and method for allowing the charging of electric vehicles when the operation of a streetlight whose power source has been tapped is not otherwise called for. That is, when operation of the streetlight is not needed, charging of electric vehicles may be provided.

Presently, facility owners wishing to provide electrical vehicle charging stations need to identify a location to be reserved for vehicle recharging, provide electric service to that location (typically by providing additional, independent electric service from their electrical panel and through a new underground power conduit running to the location), connecting a vehicle charging station to that electric service, and protecting the vehicle charging station from being overrun by a vehicle. There is a need for a charging infrastructure for electric vehicles that substantially reduces the amount of new construction and new electrical service required to provide electrical service for charging at locations that vehicles can access.

There is a further need to provide such charging infrastructure in a manner that can minimize labor and materials costs, is arbitrarily scalable.

Additionally, there is a need to provide such charging infrastructure in easily accessed locations, but in a manner that is also aesthetic.

Further, there is a need for such charging infrastructure to fail safe, that is, to have no adverse affect on the operation of the streetlight.

The present invention satisfies these and other needs and provides further related advantages.

Herein, the term "streetlight" includes electrolier streetlights (often on steel or concrete poles, with power fed from in-ground wiring) and utilitarian lights (often on wooden power poles, with power fed from overhead wiring), whether found along streets, alleys, or in parking lots.

Herein, the term "circuit breaker" refers to a reusable circuit protection device.

The term "fuse" is usually a single-use circuit protection, however, where used herein, it may be acceptably substituted with a circuit breaker.

The terms "relay", "coil", and "contact" usually describe an electromechanical device (the "relay") which provides an electromagnetic "coil" in a first circuit to magnetically operate a switching "contact" in series with a second circuit when the "coil" is energized by a voltage or current; however, where used herein, "relay" may be acceptably substituted with a "solid-state relay" or other semiconductor circuit, for example employing such components as a triac, or opto-isolators. When such substitution is made, the term "contact" refers to that portion of the substitute (e.g., the two anodes of a triac) in series with the second circuit; and the term "coil" refers to that portion of the substitute which can be operated by a voltage or current to control the second circuit (e.g., the LED of an opto-isolator, or the gate of a triac). Such a substitute need not be a direct replacement for a relay, and may include analog and/or digital logic elements, including a microprocessor.

It is an object of the present invention to provide a charging infrastructure for electric vehicles that substantially reduces the amount of new construction and new electrical service required to provide electrical service for charging at locations that vehicles can access by using the electrical service already provided for use by streetlights.

It is an object of the present invention to provide such charging infrastructure in a manner that can minimize labor and materials costs by providing a charging station that may be mounted in or on a streetlight.

It is a further object of the present invention to provide such charging infrastructure in easily accessed locations, that is in or on streetlights along streets or in parking lots.

It is an object of the present invention to provide such charging infrastructure in a manner that is unobtrusive and aesthetic, yet easy to find for those looking for a charging station.

It is a still further object of the present invention for such charging infrastructure to fail safe such that operation of the streetlight is not affected.

Another object of the present invention is to allow electric vehicles with a utility-interactive inverter to be made available to the electric grid in cases of extreme demand.

BRIEF DESCRIPTION OF THE DRAWINGS

The aspects of the present invention will be apparent upon consideration of the following detailed description taken in conjunction with the accompanying drawings, in which like referenced characters refer to like parts throughout, and in which.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE INVENTION

Figure 1:
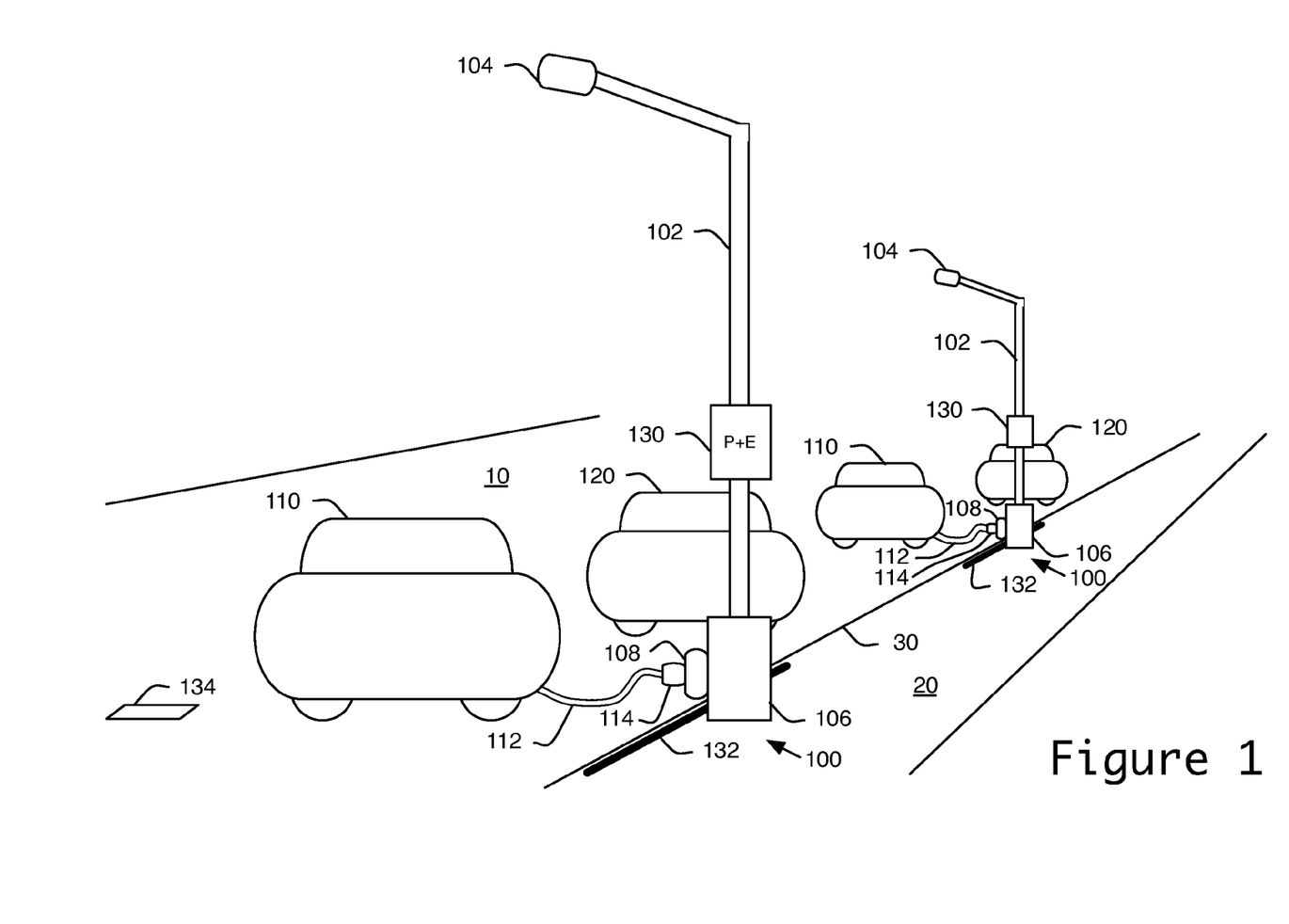
FIG. 1 is a street scene showing electric vehicles connected to charging stations of the present invention.

Referring to FIG. 1, sidewalk 20 parallels street 10, and is separated by curb 30. Charging stations 100 of the present invention comprise streetlights 102 having light fixture 104 for illuminating street 10. Cars 110 and 120 are parked along street 10, next to curb 30, where cars 110 are electric vehicles, or hybrid vehicles, and are connected by charging cord 112 terminated by plug 114 to outlet 108 in base 106 of charging station 100.

Signage 130, curb markings 132, and in-street markers 134 can designate streetlights 102 as being charging stations 100, since outlet 108 might not be easily seen by a driver looking for a parking or charging location. Designations 130, 132, and 134 may be used individually, or in combination.

Non-electric vehicles 120 are preferably prohibited from parking in the locations designated by signage 130 or curb markings 132 while connectors 108 may be used for charging; however, if outlet 108 is not available for charging, for example when a lamp in light fixture 104 is lit causing streetlight 102 to use much of its electricity supply, then such a prohibition from parking may not apply.

In an alternative embodiment, outlet 108 may be replaced by another form of coupler to which electric vehicles may standardize, for example the SAE J1772™ JAN2010 Electric Vehicle and Plug in Hybrid Electric Vehicle Conductive Charge Coupler, published by the Society of Automotive Engineers in January, 2010. Alternative embodiments may provide, rather than charging cable 112 with plug 114 inserted into outlet 108, another cable (not shown) attached in place of outlet 108, the cable having its own connector (not shown) that is inserted into electric vehicle 110 for charging. Herein, the term "outlet" should be considered include to such alternative embodiments.

Figure 2:
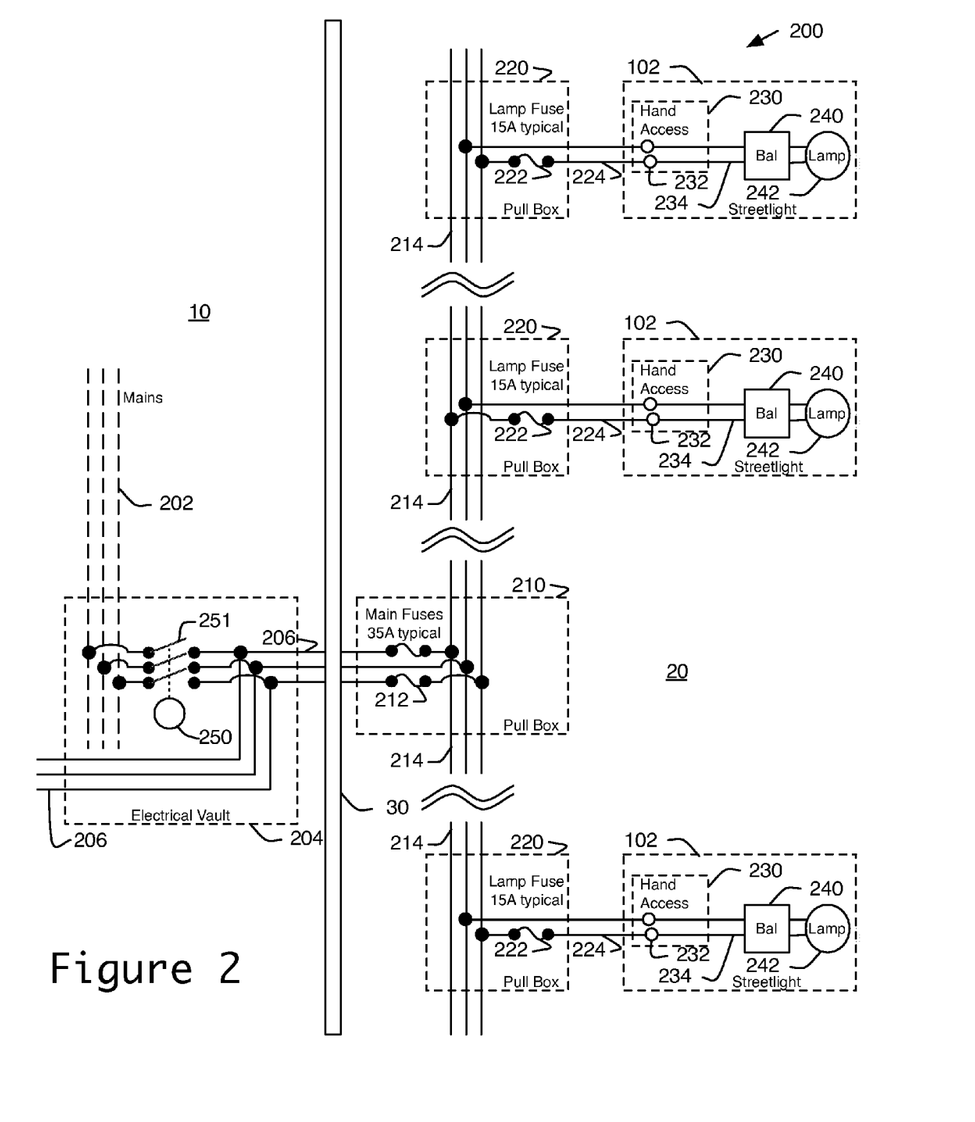
FIG. 2 is a wiring diagram for a block of typical municipal streetlights of the prior art.

In FIG. 2, a schematic of one prior art power supply 200 is shown to illustrate how power is supplied to streetlights 102. In this example, most of power supply 200 is located beneath street 10 and sidewalk 20. In other implementations, power for streetlights 102 may come from overhead wiring on power poles (described in conjunction with FIG. 4 below).

The power mains 202 are energized by a municipal supply (not shown) and may run for many miles. Periodically, for example every block, an electrical vault 204 is located below street 10. Access is typically a manhole cover (not shown). Within vault 204, power lines 206 are connected through a contactor 251 to mains 202 and run to one or both sides of the street 10 (only one side shown in FIG. 2), as needed to supply streetlights 102.

Contactor 251 opens and closes in response to controller 250, which may comprise a timer, photocell, remote control receiver, or the like. The function of controller 250 and contactor 251 is to provide power to streetlights 102 when needed, and not otherwise.

In the case where controller 250 is a timer, power is provided during predetermined hours, and may be manually adjusted at different times of the year to accommodate different sunrise/sunset times. If the timer comprises a solar event clock, then adjustment for sunrise/sunset times is automatic. Examples of a solar event clock are taught by Lienau in U.S. Pat. No. 6,680,877 and Yoshimura et al., in U.S. Pat. No. 6,888,472.

If controller 250 comprises a photocell, photodetector, camera, or other optical sensor, then contactor 251 may be closed whenever the ambient lighting falls below a predetermined amount, e.g., as the sun sets. This provides for streetlights to become active during stormy weather, even if during the daytime. Care is usually taken to avoid controller 250 being activated by debris covering the optical detector (simulating a dark situation), or being deactivated as might occur from exposure to artificial lighting (simulating daylight).

In some embodiments, controller 250 may respond to remote control signals, e.g., radio signals, that might be broadcast by a municipality to activate all or some of the streetlights 102. In other embodiments, the remote control signals might be conducted along the power mains 202 entering contactor 251, in which case controller 250 would monitor the supply to contactor 251 to detect and respond to such signals. In the present invention, contactor 251 is normally closed and controller 250 would be removed, or disabled, or set to interrupt the power source only in cases where neither streetlights nor electrical vehicle charging is permitted (e.g., as might occur during a load-shedding operation).

Power lines 206 comprise multiple conductors that carry, typically, two or three phase alternating current. Lines 206 pass through a conduit, under curb 30, and into pull box 210 where main fuses 212 are located to limit the current draw of this interval of streetlights 102.

From main fuse pull box 210, power is distributed under sidewalk 20 by power lines 214 to each streetlight pull box 220, typically located in immediate proximity to corresponding streetlight 102. In each streetlight pull box 220, streetlight fuse 222 is provided to limit the current provided to streetlight 102 by power supply 200. The last leg is delivered by power lines 224, which pass under sidewalk 20, through conduit, into the base 106 (shown in FIG. 1) of streetlight 102.

Within streetlight 102 (under the prior art), power supply 200, delivered on power lines 224 was connected to internal wires 234 at connection 232, accessed through hand access port 230. Connection 232 is normally made after steetlight 102 has been erected. Internal wires 234 deliver power to control 240 to drive lamp 242 in light fixture 104 (shown in FIG. 1). Control 240 may comprise a starter and/or ballast or other circuit as needed to start and run lamp 242. Control 240 may further comprise a photoelectric sensor or a timer (neither shown) to turn on streetlight 102 as it gets dark and turn off as it gets light. Most municipalities require control 240 to fail-safe, so if something goes wrong with the sensor or timer of control 240, corresponding streetlight 102 is on all of the time, rather than being off all of the time.

The importance of FIG. 2 is not only to describe an example of power supply 200 and its protective elements, fuses 212 and 222, but also to illustrate how much infrastructure, often below ground, is already in place to provide street lighting. Those skilled in the art already appreciate the difficulty of increasing the amount of power that supply 200 can deliver: All of cables 202, 206, 214, and 224 may need to be replaced with larger gauges. The underground conduits carrying the present cables may be inadequate for larger conductors. Likewise, fuses 212 and 222 would need replacement.

Figure 3:
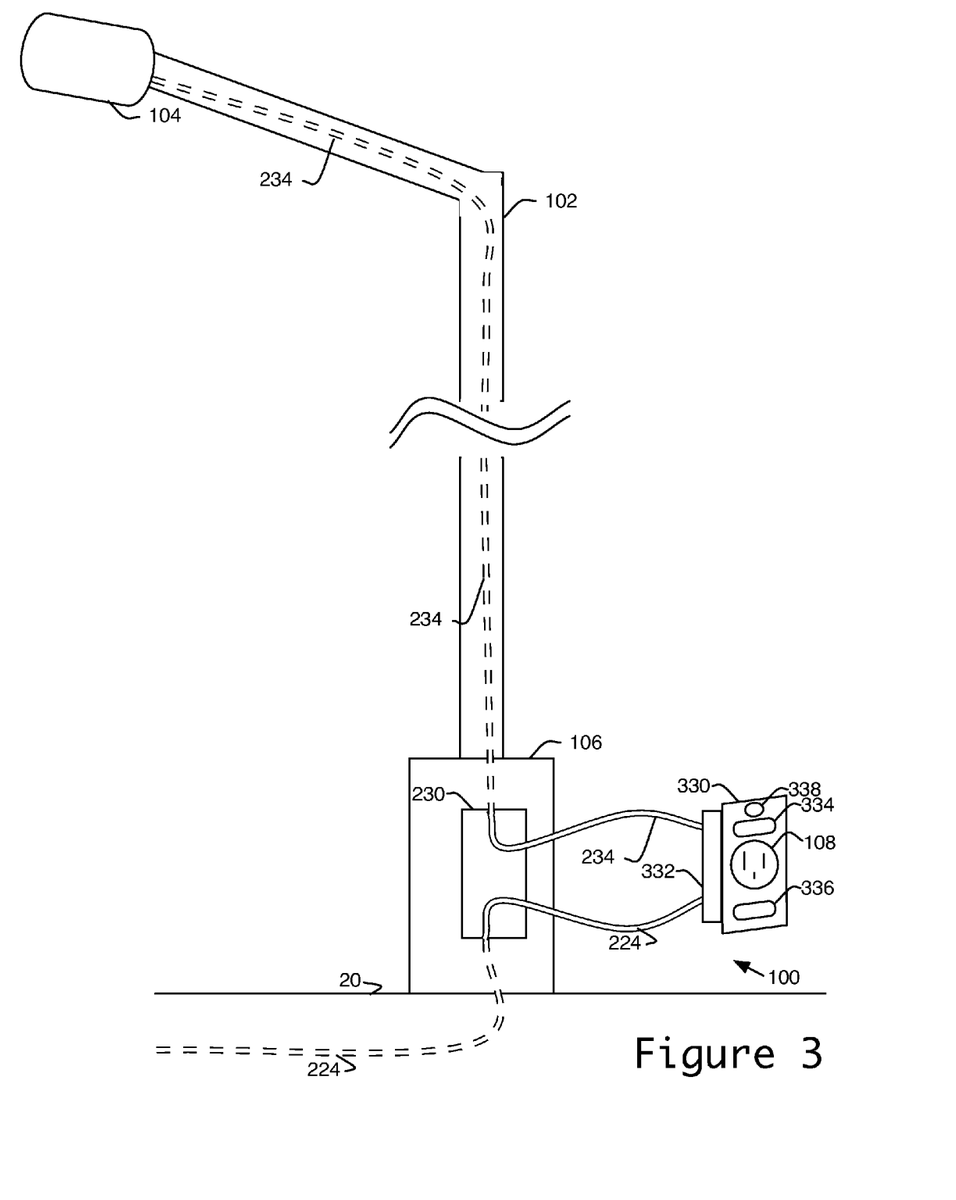
FIG. 3 shows a charging station using an electrolier streetlight.

Referring to FIG. 3, the conversion of streetlight 102 into charging station 100 of the present invention is shown. Power lines 224 enter base 106 of streetlight 102 from beneath sidewalk 20. Preferably, charging station panel 330 is a modification of or substitution for the cover panel for hand access port 230. Rather than internal wiring 234 connecting directly to power lines 224 at connection 232, both connect separately to charging control module 332. Internal wiring 234 still runs up to light fixture 104, containing control 240 and lamp 242 (shown in FIG. 2).

Charging control module 332 is preferably located inside of streetlight 102 when hand access port 230 is covered by charging station panel 330, exposing only outlet 108, reset switch 334, input 336, and sensor 338. Outlet 108, as described above, connects with plug 114 of charging cable 112 of electric vehicle 110 for charging. Reset switch 334, input 336, and sensor 338, when provided, are described below, in conjunction with FIGS. 5-8.

In some embodiments of charging cable 112 and plug 114, an integral ground-fault circuit interrupt may be provided (not shown), in which case ground-fault circuit interrupt functions need not be supplied by charging station 100.

Figure 4:
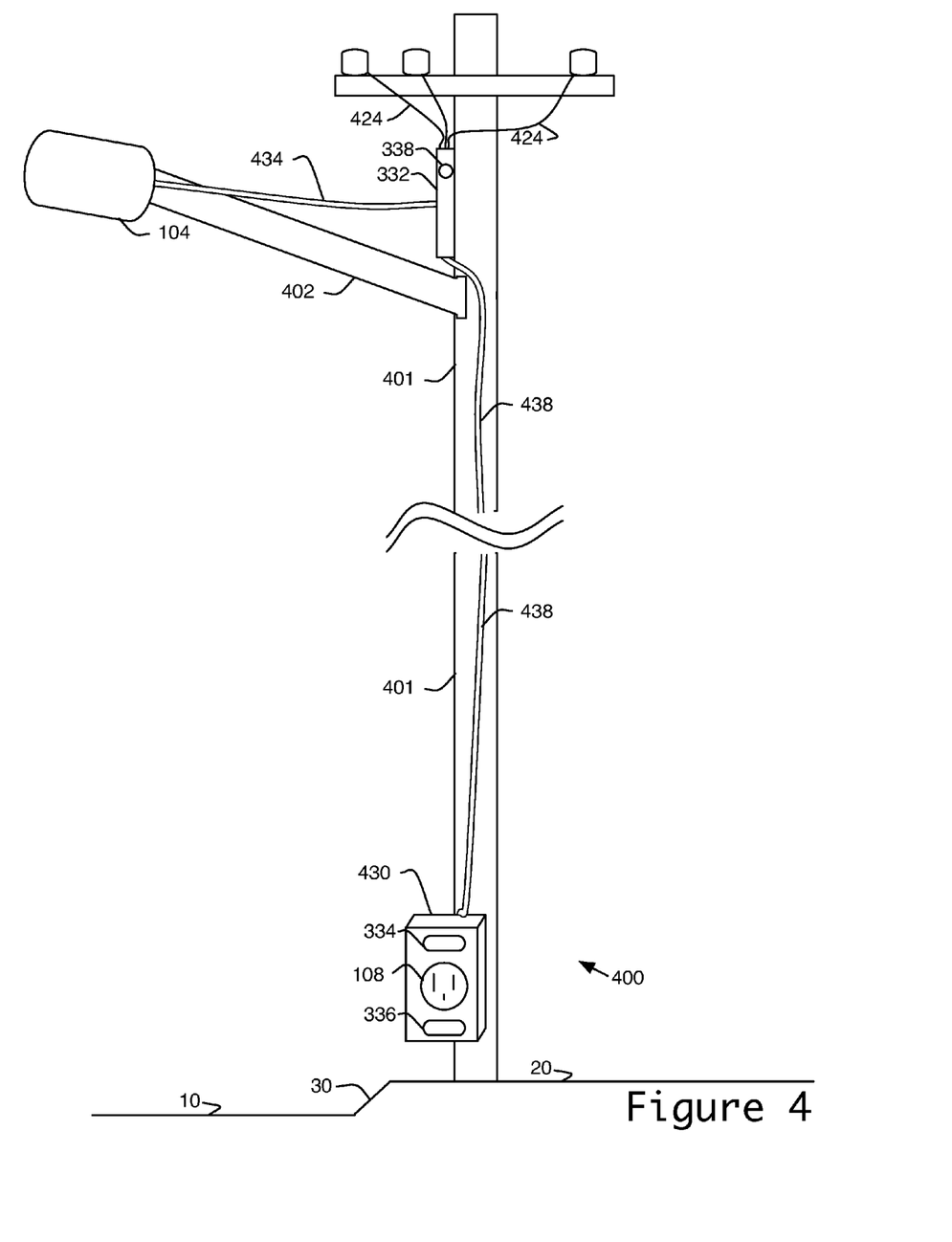
FIG. 4 shows a charging station using a utilitarian streetlight.

An alternative example embodiment of the present invention, shown in FIG. 4, is charging station 400, comprising utilitarian streetlight 402 mounted to power pole 401. Streetlight 402 has light fixture 104 which in the prior art would typically be connected directly to power supply lines 424, but in the present invention is connected to charging control module 332 by lamp wiring 434. Power supply lines 424 should provide one or more phases of alternating current suitable for powering light fixture 104, and should be protected by a fuse (not shown in FIG. 4). Power supply lines 424 feeds charging control module 332. Extension cable 438 allows outlet 108, reset switch 334 and input 336 to be located in box 430 at a convenient, accessible height. In some embodiments, sensor 338 may be located with charging control module 332 near the top of pole 401 to better avoid interference from debris and artificial lighting, or to obtain better reception than if located with box 430.

Figure 5:
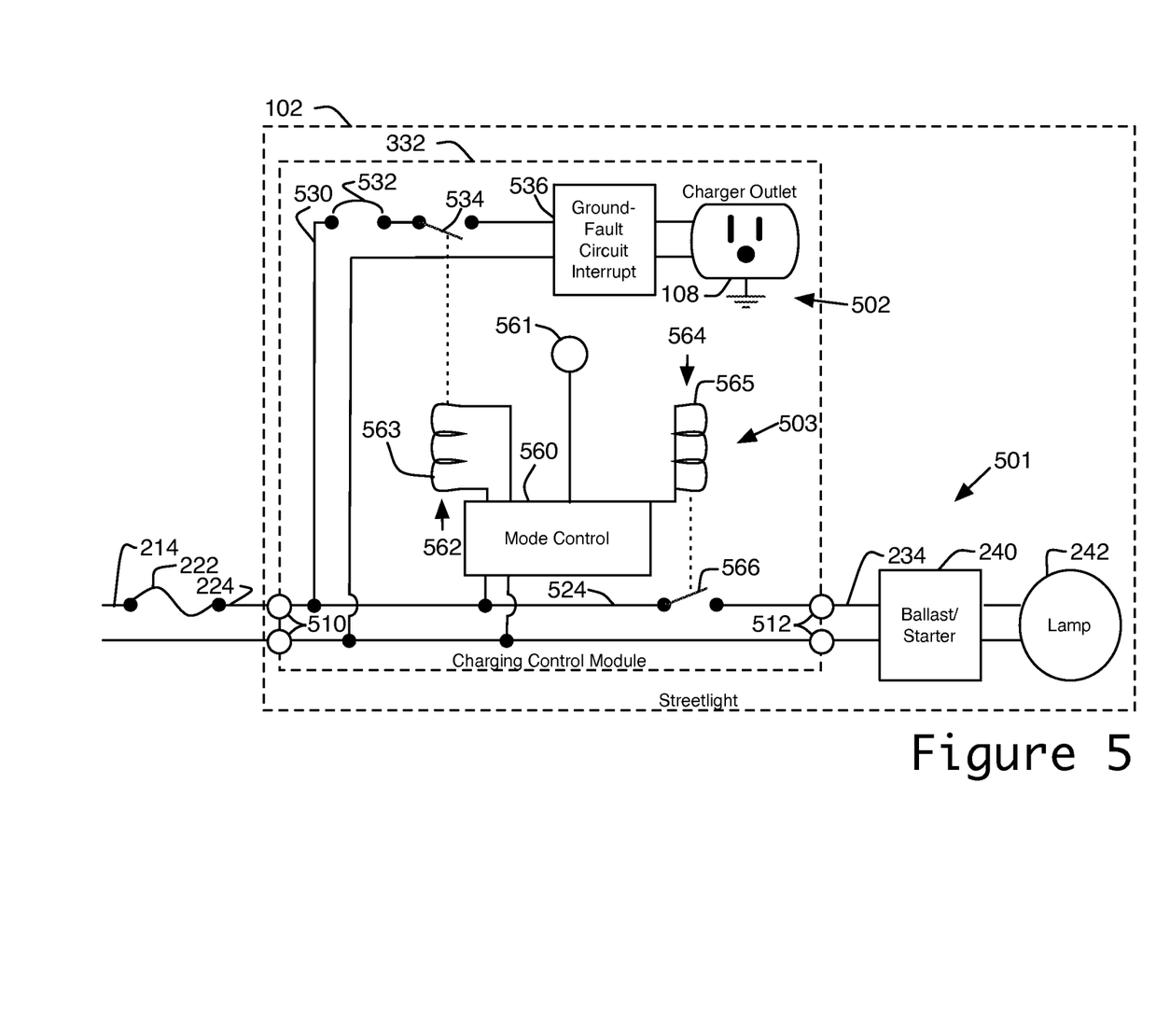
FIG. 5 is an example schematic for a charging control module that selects between operation of a charging outlet and a streetlight.

The details of one example implementation of charging control module 332 are shown in FIG. 5. Power supply lines 214 are protected by fuse 222 and delivered to input terminals 510 by power lines 224.

Lighting circuit 501 is completed by passing the power supply through charging control module 332 to output terminals 512, to streetlight internal wiring 234 to control 240, which in turn provides power to lamp 242 when lit. For typical fluorescent, low-pressure sodium, or mercury vapor lamps, control 240 is a ballast that provides the appropriate starting potential. For LED-based lamps, control 240 may include voltage converters, regulators, current limiters, temperature monitors, etc., as needed to adapt the LEDs to the power supplied. The power to control 240 and lamp 242 and their operation is switched by charging control module 332 with contact 566 of relay 564 (discussed below in conjunction with detector circuit 503).

Charging circuit 502 comprises conductors 530 which tap into conductors 524 at or near input terminals 510. Charging circuit 502 further comprises, in series, a circuit breaker 532 to limit the current drawn through outlet 108 (i.e., by the vehicle 110 charging); a relay contact 534 (discussed below in conjunction with detector circuit 503); a ground-fault circuit interrupt 536 (if required); and, outlet 108. While circuit breaker 532, contact 534, and ground-fault interrupt circuit 536 are closed, outlet 108 is available to charge vehicle 110.

Where charging cable 112 or plug 114 contains integral ground-fault protection, ground-fault circuit interrupt 536 may be omitted.

Charger outlet 108 may contain an interlock (not shown) whereby no electric potential is delivered to the contacts of outlet 108 until plug 114 is seated.

In the case where circuit breaker 532 or ground-fault circuit interrupt 536 are tripped, they can be reset with switch 334 (not shown in FIG. 5).

Preferably, ground-fault circuit interrupt 536 is provided with a test button (not shown) that simulates a current leak to ground, e.g., through a resistor (not shown). Alternatively, such a test may be performed by an external tester (not shown) plugged into outlet 108, which shunts a small amount of current to ground.

In particular, circuit breaker 532 must be of a lower current rating and/or faster break response time than fuse 222 so that a inadvertent draw of excess current through charging circuit 502 trips breaker 532 (which can be reset by the operator of vehicle 110) rather than blowing fuse 222, which requires a maintenance service call.

Control circuit 503 comprises signal source 561 for detecting whether lighting circuit 501 should be active and a mode control 560 for operating relay 562 and its coil 563 to open contact 534 thereby disabling charging circuit 502 and operating relay 564 and its coil 564 to close contact 566 thereby enabling lighting circuit 501 when signal source 561 indicates that lamp 242 should be lighting or lit. Likewise, when signal source 561 indicates that lamp 242 should be unlit, mode control 560 can operate relays 564 and 562 to open contact 566 and close contact 534 thereby disabling lighting circuit 501 and enabling charging circuit 502.

Generally, contacts 534 and 566 should not simultaneously be closed, if this would result in excess current draw that might threaten fuse 222. When switching from charging to lighting mode, mode control 560 may operate to wait for a predetermined interval between the opening of contact 534 and the closing of contact 566 so that the any inrush current drawn by control 240 as lamp 242 is lit does not exceed the rating of fuse 222 based on possible sustained currents during prior operation in charging mode. For example, when switching from charging to lighting mode, mode control 560 may be configured to wait one minute after opening contact 534 before closing contact 566.

As previously defined, relays 562 and 564 comprising coils 563 and contacts 534 and 566, respectively, may be an electromechanical device, or an analogous solid-state device (an example of which is Model A2425 manufactured by Crydom, Inc. of San Diego, Calif.). Contact 534 may be normally-open, with coil 563 energized when the signal source 561 indicates lamp 242 need not be lit. Alternatively, contact 534 may be normally-closed, with coil 563 energized when signal source 561 has indicated lamp 242 should be lit. A similar normally-open or normally-closed state for contact 566 may be selected, with the corresponding logic employed by mode control 560. Still another alternative would be for breaker 532 to have a shunt-trip input such that the contacts of breaker 532 would also serve as contact 534 and let coil 563 be the shunt-trip mechanism internal to the breaker (an example of such a device is the ED21B015 circuit breaker with the S01ED60 shunt trip accessory manufactured by Siemens Energy & Automation Inc. of Alpharetta, Ga.), where mode control 560 causes breaker 532 to open when signal source 561 has indicated lamp 242 should be lit.

In still another example embodiment, relays 562 and/or 564 may be a latching device which can be opened or closed by a corresponding pulse from mode control 560. For example, following a pulse to relay 563 contact 534 would remain in the same state (opened or closed) until commanded to switch by mode control 560.

Signal source 561 may comprise a timer, photodetector, remote control receiver, or some other sensor, to determine whether or not lamp 242 should be lit, and to which mode control 560 has communication and is configured to respond by controlling relays 562 and 564.

In an embodiment where signal source 561 comprises a timer, the timer is configured to signal that lamp 242 should be operational during a predetermined interval spanning all or much of the night, e.g., from 6 pm to 6 am. The predetermined interval might be adjusted at different times of year to accommodate changing sunrise and sunset times. In an alternative embodiment, the timer may be based on solar time, in which case adjustments because of the time of year would not be necessary. The timer may derive power the supply lines 524, or from a different source. The timer may derive its primary timebase from these supply lines, or may use a broadcast source (e.g., GPS satellite signals or shortwave radio time signals such as those broadcast by the U.S. National Institute of Standards and Technology's station, WWV). The timer may have a local, battery-backed timebase to keep time through power outages and for situations when broadcast time is not available.

In embodiments where signal source 561 comprises a photodetector (e.g., a photoresistor, photodiode, or electronic camera), signal source 561 monitors the ambient natural light level. If there is enough natural light present, then lamp 242 is not required to be lit. However, when there is insufficient natural light, then lamp 242 should be lit. Signal source 561 can filter the light to minimize the influence of artificial light sources, may filter the amount of natural light over time (i.e., to low-pass the natural light measurement), and may provide hysteresis, to eliminate unwanted signals. When an electronic camera is provided, portions of the field-of-view of the camera may be computationally masked, for example to eliminate other streetlights, traffic, artificial light sources (e.g., illuminated signage). When signal source 561 comprises a photodetector, the position of the sun is not the only determinant of whether or not lamp 242 should be lit, since weather (e.g., clouds or fog) may reduce the amount of natural light detected and signal that the lamp should be lit when it might otherwise not be had the weather been clear.

Embodiments of signal source 561 comprising both a solar event clock and a photodetector may use the photodetector to automatically calibrate the solar event clock. Such a calibration can take place over an extended numbers of days, during which time the signal source can signal to mode control 560 as if only the photodetector were present, but once the solar event clock is substantially adjusted, the timer can be the primary determinant. This can be useful in circumstances where a photodetector might be subject to being covered for extended periods of time, for example by snow and ice following a storm.

In embodiments where signal source 561 is a remote control receiver, a transmitted command (not shown, but discussed below in conjunction with signal source 761 in FIG. 7) by a municipality or other owner of streetlight 102 may indicate that streetlight 102 should be turned on or turned off. Signal source 561 receives the transmitted command and provides the lamp on/lamp off signal to mode control 560.

In some embodiments, mode control 560 may provide a more sophisticated control wherein rather than merely providing activation of charging circuit 502 whenever lighting circuit 501 is not needed, charging circuit 502 is separately controlled. For example, charging circuit 502 might be controlled by an non-solar timer in signal source 561, and provide power from 8 am to 5 pm, except when a solar event clock or photodetector in signal source 561 signals that lamp 242 should be on. Likewise, charging circuit 502 might be directed to shut down when power capacity is overburdened as a load-shedding operation, as might be commanded by a municipal broadcast received by signal source 561, only to be resumed later as the load-shedding ends or rolls to difference electric customers. Thus, charging circuit 502 may be restricted to operate in conditions more limited than merely "when lamp 242 is not needed."

Mode control 560 and signal source 561 require a power source, which may be tapped from input terminals 510 and lines 524, or developed through an inductive connection to conductors 530 and/or 524. In alternative embodiments, a battery and/or a solar-powered photovoltaic (neither shown) may be used.

In still another example embodiment, rather than relay 564 being directly connected to mode control 560, control 240 may comprise a remote control ballast able to accept a signal from mode control 560 over lines 524 and 234 to command lamp 242 to light or not. Lamp control 240 may further permit dimming of the lamp, as might occur in the early morning hours, according to a schedule imposed by a timer in signal source 561.

Figure 6:
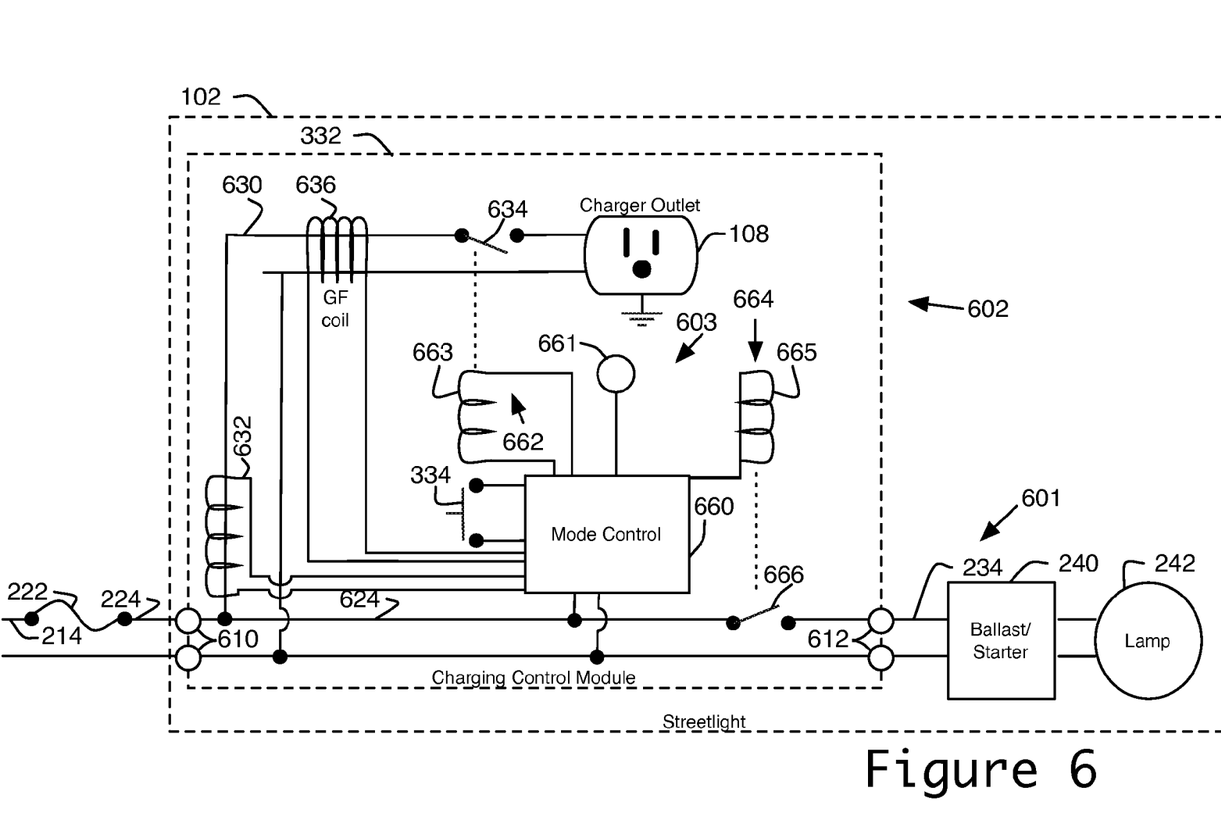
FIG. 6 is another example schematic for a charging control module that selects between operation of a charging outlet and a streetlight.
Figure 7:
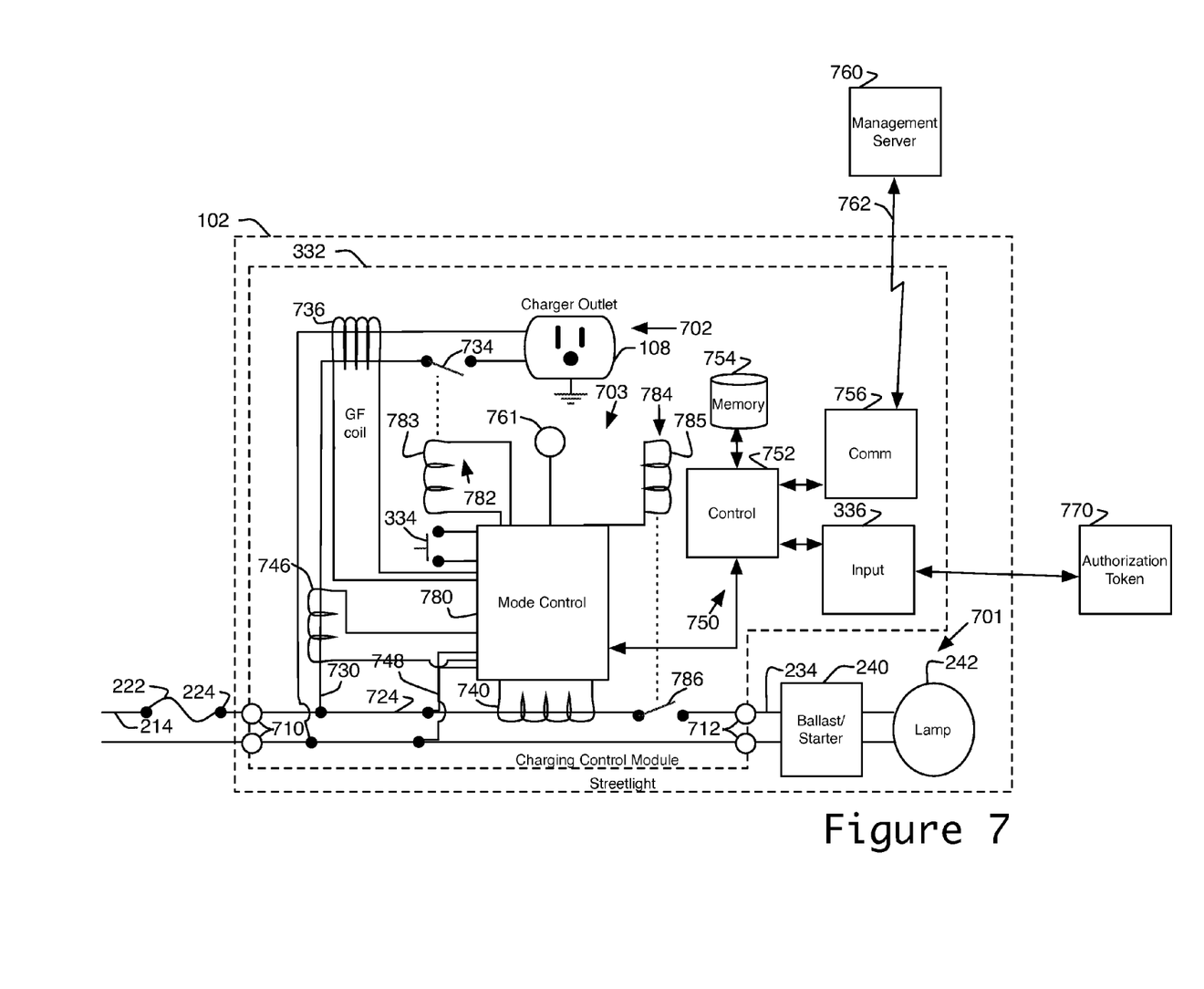
FIG. 7 is an third example schematic for a charging control module that selects between operation of a charging outlet and a streetlight, this one separately monitoring the current of the streetlight and charging outlet.

In some embodiments, separate relays 562 and 564 (or the corresponding relays shown in FIGS. 6 & 7) may be replaced by a single relay driving both contacts 534 and 566 (or the corresponding contacts in FIGS. 6 & 7). In such an embodiment, these contacts would have opposite rest states, i.e., one would be normally-open and the other normally-closed, and thereby operate in opposition. The advantage of having separate relays as shown in the figures is that the system offers a state in which neither light circuit 501 nor charging circuit 502 is energized, as might be appropriate during daylight but outside of allowed parking times, or during a load shedding period.

Mode control 560 may have indicators (not shown) to show the status of the mode control (e.g., "ready to charge", "not ready to charge"). Such indicators may be independently driven or may have the same drive as the relay coils 563, 565.

Another example embodiment of charge control module 332 is shown in FIG. 6. This embodiment also consists of lighting circuit 601, charging circuit 602, and control circuit 603. Here, the primary difference is that control circuit 603 further responds to current being leaked to ground, as detected by ground-fault coil 636.

Here, the power supply is provided at input terminals 610 and passed by conductors 624, through contact 666 of relay 664 to output terminals 612 to the streetlight control 240 and lamp 242, forming lighting circuit 601. Charging circuit 602 is powered by conductors 630.

The mode control 660 shown in FIG. 6 is an example of a more integrated control circuit 603, where the ground-fault detection coil 636, overcurrent detection coil 632, and coils 663 and 665 of relays 662 and 664 implement the functions of control circuit 503 responsive to signal source 661, but without separate ground fault circuit interrupt 536 and circuit breaker 532.

In this arrangement, reset switch 334 may be electrical, as shown, and allow mode control 660 to close contact 634, provided signal source 661 is not calling for lamp 242 to be lit.

Having control circuit 603 implemented with more integrated mode control 660 that incorporate the functions of circuit breaker 532 and ground fault circuit interrupt 536 may provide cost advantages.

That same advantage can be obtained using another example embodiment, shown in FIG. 7 in which the streetlight circuit 701 passes through charging control module 332 at input terminals 710, through conductors 724, contact 786 of relay 784, and output terminals 712. Conductor 730 of charging circuit 702 taps off of conductors 724 near input terminals 710. Charging circuit 702 can be interrupted by contact 734 of relay 782. In this embodiment, charging control circuit 703 uses signal source 761 to determine the appropriate state for lighting circuit 701. Current sensor 740 monitors the current used by lighting circuit 701, while current sensor 746 is used to monitor the current in charging circuit 702. Mode control 780 computes the total current drawn by lighting and charging circuits 701 and 702 (whether through an analog sum or through separate analog to digital conversions which are then summed). If the total current drawn is above a value determined to threaten fuse 222, then coil 783 is appropriately driven to cause contact 734 to open.

Ground-fault sensor 736 may be monitored by mode control 780 to interrupt circuit 702 with relay 782 when a ground-fault is detected.

Switch 334 may be an electrical or mechanical switch to reset contact 734 following an over-current or a ground-fault detection which resulted in contact 734 being opened.

To measure power usage, mode control 780 also comprises voltage monitor connection 748 (this connection may also provide the power for mode control 780). The instantaneous product of the measured voltage (e.g., in volts) at connection 748 and the current measured with current detector 746 (e.g., in amps) represents the instantaneous power drawn through circuit 702 (in watts). By measuring this instantaneous power periodically (e.g., 1000 times per second) and multiplying that reading by the period (i.e., 1 mS), and accumulating the result, mode control 780 can measure the energy transferred (i.e., watt-seconds, or with the appropriate conversion factors, kilowatt-hours). A similar measure of energy delivered to lighting circuit 701 may also be made and recorded, if desired.

In a case where electric vehicle 110 comprises a utility-interactive inverter and power is being fed from electric vehicle 110 to power supply 214, then such instantaneous power measurements would register a supply of power by vehicle 110, rather than a draw, and may be credited in accordance with the utility's policy.

A similar measurement could be made with current detector 632 of charging control circuit 603, so that a power measurement would represent the power being delivered to charging circuit 602.

FIG. 7 also shows monitoring and communication subsystem 750 connected to charge control circuit 703, but which could be connected to charge control circuits 503, 603 instead.

Monitoring and communication subsystem 750 preferably comprises a control 752 having access to memory 754 for storing the software program of control 752. Memory 754 may also store data, for example, data representative of the accumulated power (i.e., energy, as in watt-hours) delivered through charger circuit 702 as measured and communicated by mode control 780 to control 752. Such record of energy delivered is preferably stored in non-volatile memory. (Note that while this is one example implementation for an energy meter, other implementations are well known.)

Memory 754 may also contain a unique identifier for identifying charging control module 332, and by association, streetlight 102, which is useful for reporting and management. Alternatively, a unique identifier may be provided in control 752 (e.g., a unique CPU serial number) or in communications module 756 (e.g., a Media Access Control address, or MAC address).

Monitoring and communication subsystem 750 may comprise a human readable display (not shown) and/or a short range wireless reporting system (not shown) such as those commonly used for utility meter reading to allow efficient readout of the record of energy delivered and the unique identifier of the charge control module 332.

Preferably, monitoring and communication subsystem 750 further comprises communication module 756 which is able to connect through communication channel 762 with management server 760 located at a remote site, for status monitoring, meter reading, and billing (discussed below in conjunction with input 336). Communication channel 762 may comprise a wireless connection and may further comprise other communications legs, including the Internet. The wireless leg(s) may be based on any of a number of wireless network technologies, for example, cellular telephone, IEEE 802.11 (i.e., WiFi), or IEEE 802.15.4 (i.e., ZigBee). In some wireless network topologies, for example those using ZigBee, communications from charging control module 332 in one streetlight 102 may be routed and relayed through other such modules 332 in other streetlights 102 until a gateway is reached. Communication channel 762 may comprise communications over the powerline 214 (connection not shown), as for example provided by the LonWorks protocol used by communications modules such as the PL31xx Smart Transceivers marketed by Echelon Corporation of San Jose, Calif. and the appropriate coupling circuit taught in at least their U.S. Pat. Nos. 5,241,283 and 6,636,117 by Sutterlin et al., and U.S. Pat. No. 5,828,676 by Hurlbut, et al.

In embodiments where signal source 561, 661, 761 comprise a remote control receiver, the remote control commands may be transmitted via such as communication channel 762 to which the signal source has communication (connection not shown) and through which the signal source is able to obtain such commands. In one example embodiment, the communication channel 762 may comprise radio-frequency transmissions over public safety bands licensed to municipal governments.

Management server 760 may receive reports from charging control modules 332, or may interrogate them, or both. Whether communication is initiated by management server 760, or by communication module 756, management server 760 is able to access status, energy meter records, and other information.

Monitoring and communication subsystem 750 preferably comprises input 336, which accepts an authorization code (which may be an identification) supplied by a user before enabling charging circuit 702 and outlet 108. In some embodiments, input 336 is an RFID (radio-frequency identification) reader that is able to read authorization token 770, comprising an RFID tag. Alternatively, authorization token 770 may be a magnetic card (for instance, a credit card or drivers license) and input 336 comprises a magnetic card reader, in which case the authentication code comprises the credit card number or drivers license number contained on the magnetic stripe of the card). In still another embodiment, input 336 may comprise a keyboard and a user enters an authentication code (i.e., an identification number, personal identification number, or passcode) manually, rather than using a token that is read.

If, as a matter of policy, only validated users are permitted to make use of charger outlet 108, then an RFID tag or other authorization token, identification code, or passcode would be provided to the authorized users in advance. The authorization code would be accepted by input 336. The authorization code so received is used by control 752 to query management server 760 (through communication channel 762) to verify the authorization code. If server 760 responds that the authorization code represents a currently authorized user, then the user is validated and charging circuit 702 may be energized. In another alternative embodiment, the passcode may be one delivered and verified as taught by Outwater et al., in PCT/US11/28012 filed Mar. 11, 2011.

Also, if as a matter of policy, use of the charging outlet 108 is billed, either by time or by energy consumed, then the authentication code would be used by management server 760 to charge the user's corresponding account. In this case, management server 760 may accumulate the monthly usage by each user and bill periodically (e.g., adding the energy consumed from each of a user's chargings to the user's utility bill, and in the case of an electric vehicle with a utility-interactive inverter, crediting a user for energy supplied by the vehicle), or may handle each transaction independently (e.g., placing a charge or credit to the credit card used as authorization token 770).

Thus, a simple example use case would be that, during daylight hours, while the streetlights 102 are not lit, a user (not shown) pulls up to streetlight 102 in electric vehicle 110 and parks. User connects vehicle 110 to charging station 100 by plugging charging cable 112 into charging outlet 108. If necessary, user presses reset switch 334 to clear a previous ground-fault circuit interrupt or current overload condition. If needed, the user presents an authorization code through input 336, for example by passing a key fob containing an RFID authorization token 770 in proximity to input 336. Charging circuit 502, 602, or 702 is made active, and electric vehicle 110 is allowed to charge. As the sun sets, or it is otherwise time for the streetlight to light, signal source 561, 661, 761 notifies mode control 560, 660, 780, the charging circuit is de-energized, and lighting circuit 501, 601, 701 is energized allowing starter/ballast/control 240 to light lamp 242, without threatening fuse 222.

In implementations that can determine that the total current of both the lighting and charging circuits (e.g., 701 and 702), it may be the case that the charging of electric vehicle 110 has slowed to the point where the addition of the operating current of lamp 242, when lighting or when lit, does not exceed the rating of fuse 222, in which case, relay 782 may remain energized and contact 743 remain closed. This will be especially true if lamp 242 is a retrofit LED-based illuminator that consumes substantially less power than streetlight 102 was originally designed to draw.

While the schematics of FIGS. 5-7 have shown a single-phase power supply to facilitate explanation, the principles presented here can be adapted for a two- or three-phase power system to provide more power and correspondingly shorter vehicle charge times.

Figure 8:
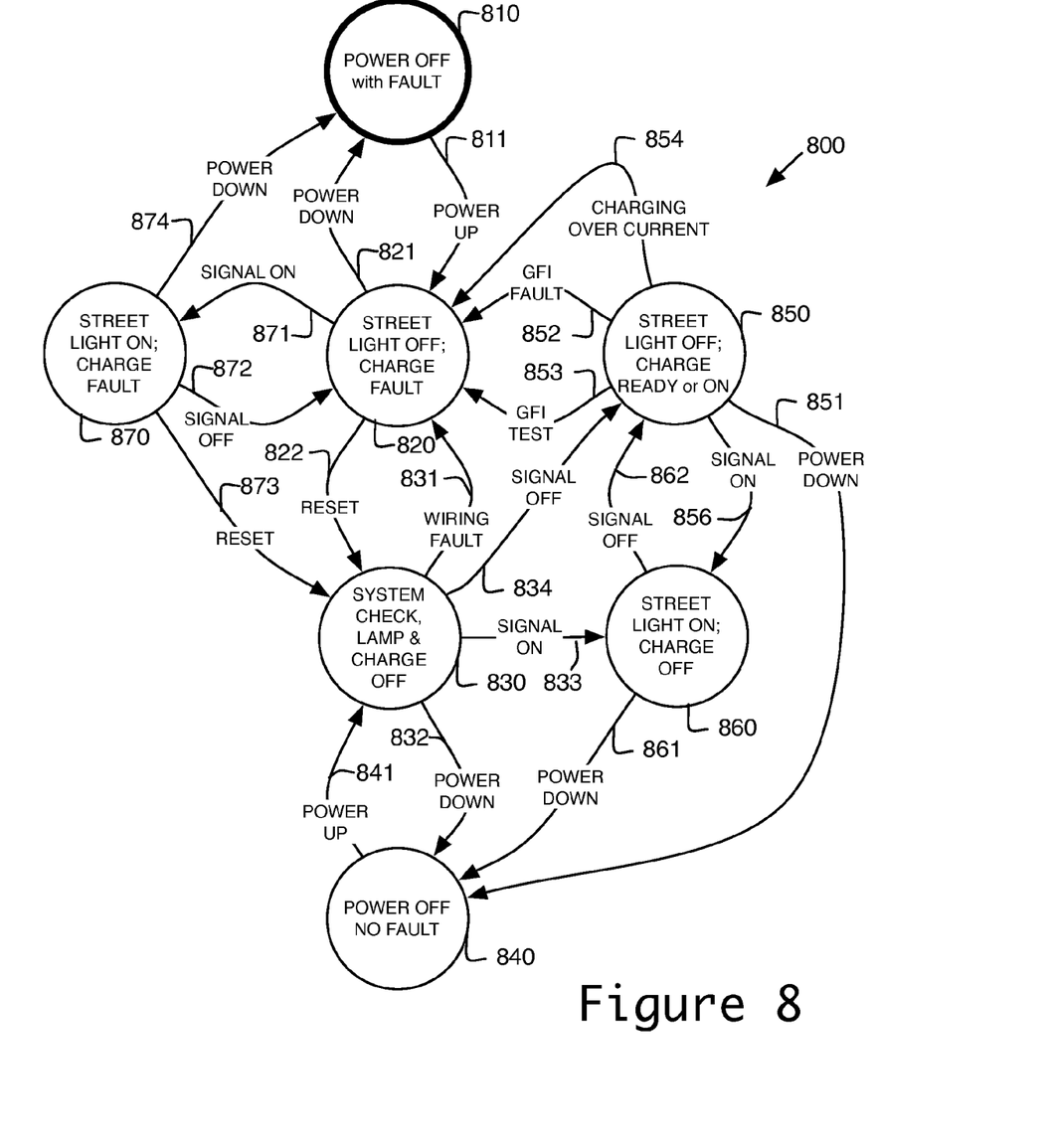
FIG. 8 is an example state transition diagram for controlling the operation of a streetlight and charging outlet.

An example state transition diagram 800 for the charging station 100 of the present invention is shown in FIG. 8.

Unpowered, faulted state 810 is the initial state, occurring when charging control module 332 is unpowered with a fault recorded. Module 332 may be delivered from the factory in this state. The only transition from this state occurs when power is applied 811, where module 332 transitions to a faulted state 820.

In faulted state 820, charging circuit 502, 602, 702 is off. If signal source 561, 661, 761 indicates lamp 242 should be on 871, then module 332 transitions to faulted, lamp on state 870 and lighting circuit 501, 601, 701 is energized. If signal source 561, 661, 761 indicates the lamp should be off 872, the lighting circuit is de-energized and the state returns to faulted state 820. If in faulted, lamp on state 870 the power is removed 874, module 332 returns to unpowered, faulted state 810. Likewise, if power is removed 821 while in faulted state 820, the module 332 transitions back to unpowered, faulted state 810. In either of states 820, 870, if reset switch 334 is thrown 822, 873 (respectively), module 332 transitions to check state 830.

In check state 830, charging circuit 502, 602, 702 and lighting circuit 501, 601, 701 both remain off. Upon entry to check state 830, and if capable, the mode control 560, 660, 780 first tests for a wiring fault (e.g., a reversal of hot and neutral lines feeding the charging circuit) and if detected 831, module 332 transitions back to faulted state 820. This prevents module 332 from operating the charging circuit while miswired. Otherwise, if power is removed 832 (or fails), module 332 transitions to unpowered, unfaulted state 840. If signal source 561, 661, 761 indicates lamp 242 should be on 871, then module 332 transitions to lamp on state 860 and lighting circuit 501, 601, 701 is energized. Otherwise 834, lighting circuit 501, 601, 701 remains de-energized and lamp 242 remains off, and module 332 transitions to ready state 850.

From unpowered, unfaulted state 840, the only transition is when power is reapplied 841, to check state 830. In an alternative embodiment, unpowered, unfaulted state 840 may be folded together with unpowered, faulted state 810, and when power is restored, the successor state is faulted state 820.

On entry to ready state 850, charging circuit 502, 602, 702 is enabled, unless required by policy to be enabled only after further authorization or activation through input 334 (not explicitly shown in state transition diagram 800). If power is removed 851, the system transitions to unpowered, unfaulted state 840. If a ground-fault is detected 852, or a ground-fault is induced by test 853, the state transitions to faulted state 820, and charging circuit 502, 602, 702 is disabled. If the charging circuit 502, 602, 702 current draw exceeds a predetermined value 854, a value selected to protect fuse 222, then the system transitions to faulted state 820: In the case of example charging circuit 502, this would correspond to tripping the circuit breaker 532, whereas in example charging circuit 602, 702, the corresponding mode control 660, 780 would open the corresponding relay 662, 782. If signal source 561, 661, 761 indicates that the lamp 242 should be on 856, then the system transitions to lamp on state 860, where charging circuit 502, 602, 702 is disabled.

Upon entry into lamp on state 860, charging circuit 502, 602, 702 is disabled, and lighting circuit 501, 601, 701 is energized, lighting lamp 242. Note that charging control module 332, as shown, does not protect fuse 222 from excessive currents drawn solely by lighting circuit 501, 601, 701, though other embodiments could offer protection from the lighting circuit, too. From lamp on state 860, if power is removed 861, the state transitions to unpowered, unfaulted state 840. When signal source 561, 661, 761 indicates that the lamp is no longer needed 862, lighting circuit 501, 601, 701 is de-energized with relay 564, 664, 784 so lamp 242 is no longer lit, charging control module 332 transitions to ready state 850. As discussed above, if signal source 561, 661, 761 comprises a photodetector to determine whether lamp 242 should be lit, some degree of hysteresis is desirable to prevent unwanted, rapid oscillations between ready state 850 and lamp on state 860. A time delay of several seconds or minutes may further be included in conjunction with transition 862 during which a re-lighting of lamp 242 would cause the system to return to lamp on state 860 without having energized charging circuit 502, 602, 702. Such a delay could be incorporated into signal source 561, 661, 761, or in mode control 560, 660, 780.

Embodiments of the present invention should comply with Article 625 of the National Electrical Code, and if used to support an electric vehicle feeding energy back into the electric grid, then embodiments should further comply with Article 705.

Various additional modifications of the described embodiments of the invention specifically illustrated and described herein will be apparent to those skilled in the art, particularly in light of the teachings of this invention. It is intended that the invention cover all modifications and embodiments, which fall within the spirit and scope of the invention. Thus, while preferred embodiments of the present invention have been disclosed, it will be appreciated that it is not limited thereto but may be otherwise embodied within the scope of the following claims.

I claim:

1. A charging station for an electric vehicle, said charging station comprising:
   a streetlight;
   a power source protected by a fuse, said fuse having a current rating,
   a first circuit connecting said streetlight to said power source, said streetlight drawing a first current through said first circuit, said first current not greater than said current rating when said streetlight is lit;
   a second circuit having an outlet for connecting a vehicle to said power source, said vehicle drawing a second current through said second circuit when said vehicle is charging;
   a first relay having a first contact in series with said first circuit, said first relay operable to energize the first circuit with said first contact to enable the streetlight to light, said first relay further operable to break the first circuit with the first contact to disable the streetlight;
   a second relay having a second contact in series with said second circuit, said second relay operable to energize said second circuit with said second contact to allow charging the vehicle, said second relay further operable to break said second circuit with said second contact to disable charging the vehicle;
   a signal source to provide a first indication when the streetlight should be lit and a second indication when the streetlight should not be lit;
   a third circuit having control of the first and second relays, the third circuit having communication with and being responsive to the signal source,
   wherein, the third circuit operates the second relay to break the second circuit and operates the first relay to complete the first circuit when the first indication is provided;
   the third circuit operates the first relay to break the first circuit when the second indication is provided;
   the third circuit further operates the second relay to complete the second circuit when at least the second indication is provided;
   whereby said outlet is available for charging the vehicle when said streetlight is not lit.

2. The charging station of claim 1 wherein the signal source comprises a photodetector for detecting natural light, the signal source providing the first and second indications based on the amount of natural light the photodetector detects.

3. The charging station of claim 1 wherein the signal source comprises a timer, the signal source providing the first and second indications based on the time of the timer and at least one predetermined on-time, and a corresponding at least one predetermined off-time for the streetlight.

4. The charging station of claim 3 wherein the timer is a solar event clock.

5. The charging station of claim 1 wherein the signal source comprises remote control receiver, the signal source providing the first and second indications based on commands received with the remote control receiver.

6. The charging station of claim 1 further comprising:
   an input, said input having communication with said third circuit, said input accepting an authentication code;
   wherein said third circuit operates said relay to complete said second circuit when said authentication code is accepted while the second indication is provided.

7. The charging station of claim 1 wherein
   said third circuit further comprises a second detector responsive to said second current,
   said third circuit further operating said second relay to break said second circuit when said second current exceeds a non-zero first predetermined value not greater than the current rating;
   whereby said relay is operated to protect said fuse.

8. The charging station of claim 7 further comprising:
   an energy meter, said energy meter making a record of energy delivered through at least the second circuit.

9. The charging station of claim 8 further comprising:
   a display having communication with said energy meter, said display showing the record of energy delivered.

10. The charging station of claim 8 further comprising:
    a communication module, said communication module having a connection to a communication channel, said communication module further having communication with said energy meter;
    whereby said energy meter can be read remotely through said communication channel.

11. The charging station of claim 10 further comprising:
    an input, said input having communication with said third circuit and said communication module, said input accepting an authentication code, said input verifying said authentication code with said communication module through said communication channel;
    wherein said third circuit operates said second relay to complete said second circuit when said authentication code is verified while the second indication is provided.

12. A method for charging an electric vehicle, said method comprising the steps of:
    a) providing a first circuit comprising a power supply and a streetlight through a first contact of a first relay, and a second circuit for connecting an electric vehicle to the power supply through a second contact of a second relay;
    b) providing a signal source to indicate to a third circuit whether said streetlight should be lit, the third circuit operatively connected to the first and second relays;

c) automatically, with the third circuit, operating said second relay to open said second contact and operating said first relay to close said first contact when said signal source indicates said streetlight should be lit; and, d) automatically, with the third circuit, operating said first relay to open said first contact when said signal source indicates said streetlight should not be lit; and, e) operating, with the third circuit, said second relay to close said second contact when said signal source indicates said streetlight should not be lit;

whereby said electric vehicle may charge when said streetlight is not lit.

13. The method of claim 12, wherein said power supply is protected by a fuse having a current rating, and wherein said third circuit comprises at least one current detector, the current detector being responsive to at least a second current in said second circuit, and wherein step e) is further constrained top operate said second relay to open said second contact when the said second current exceeds a predetermined value, said predetermined value not greater than said current rating.

14. The method of claim 12 further comprising the steps of:
f) providing an input, said input able to accept an authentication code, said input having communication with the third circuit; and, wherein, in step e), the third circuit further requires the authentication code to have been accepted by said input.

15. The method of claim 12 further comprising the step of:
f) automatically making a record of energy delivered through at least said second circuit with an energy meter.

16. The method of claim 15 further comprising the step of:
g) providing a display having access to the record of energy delivered; and,
h) displaying the record of energy delivered with the display.

17. The method of claim 15, further comprising the step of:
g) providing a communication module having connections to a communication channel and said energy meter; and,
h) remotely accessing the record of energy delivered through said communication channel.

18. The method of claim 17, further comprising the steps of:
i) providing an input, said input able to accept an authentication code;
j) verifying said authentication code through said communication channel; and,
wherein, in step e), the third circuit further requires the authentication code to have been verified.

* * * * *